United States Patent [19]

Bonnet et al.

[11] Patent Number: 5,321,727
[45] Date of Patent: Jun. 14, 1994

[54] SIGNAL PHASING ARRANGEMENT IN A SYSTEM FOR DOUBLING THE DIGITAL CHANNEL

[75] Inventors: Jean-Marc Bonnet, Paris; Jean-Yves Auclair, Trappes, both of France

[73] Assignee: U.S. Philips Corporation, New York, N.Y.

[21] Appl. No.: 693,990

[22] Filed: Apr. 29, 1991

[30] Foreign Application Priority Data

Apr. 27, 1990 [FR] France .................. 90 05411

[51] Int. Cl.$^5$ .................. H04B 7/10; H04L 1/02; H04L 7/00; H04L 25/36
[52] U.S. Cl. .................. 375/100; 375/118
[58] Field of Search .................. 375/100, 38, 40, 118; 455/132–134, 59, 60

[56] References Cited

U.S. PATENT DOCUMENTS 3,628,149 12/1971 Swan .................. 455/133 X
4,015,205 3/1977 Ikeda et al. .................. 455/133 X
4,218,654 8/1980 Ogawa et al. .................. 370/97

Primary Examiner—Stephen Chin
Assistant Examiner—Tesfaldet Bocure
Attorney, Agent, or Firm—David R. Treacy

[57] ABSTRACT

In response to a low-frequency superframe signal, the input frames TRA, TRB of each of two digital channels, shifted in time, are applied each to a frame locking circuit which produces sync signals SYA, SYB; and are also applied to a common cyclic addressing double memory. In the write mode each memory location is addressed to contain a block of TRA and a block of TRB of the same rank controlled by write counters which are incremented by the signals SYA and SYB. Each location has a read counter which is shifted to the more delayed signal of the sync signals SYA and SYB by a phase comparator and a coincidence detector. The output signals having information frames TRA' and TRB' are in phase.

15 Claims, 3 Drawing Sheets

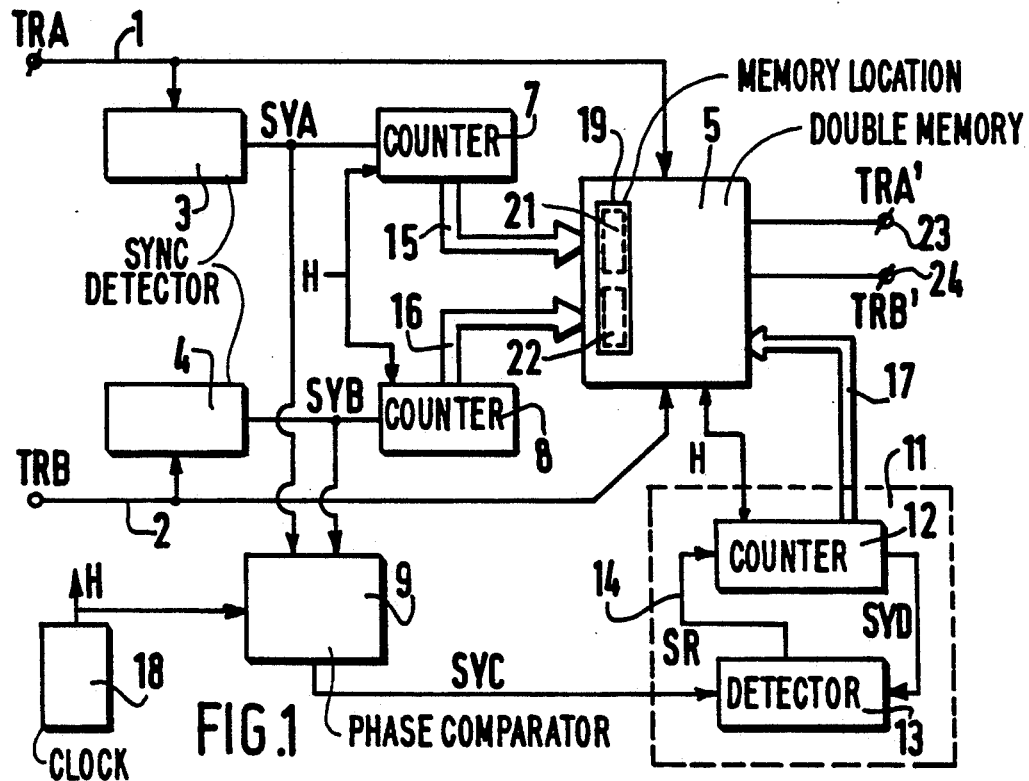
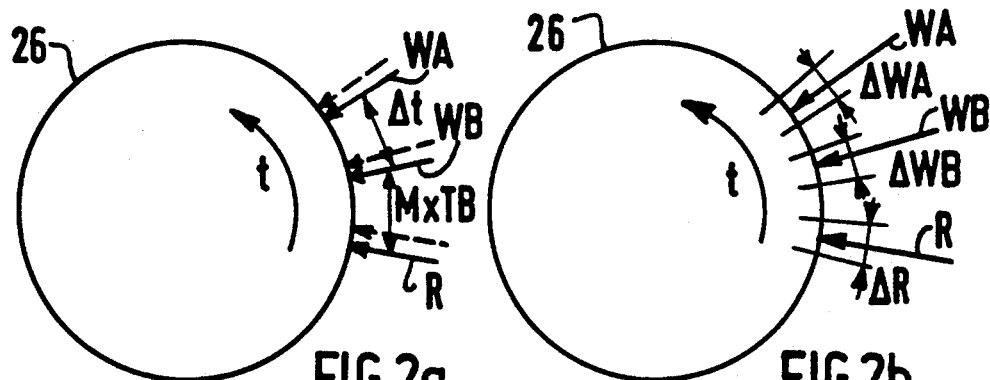
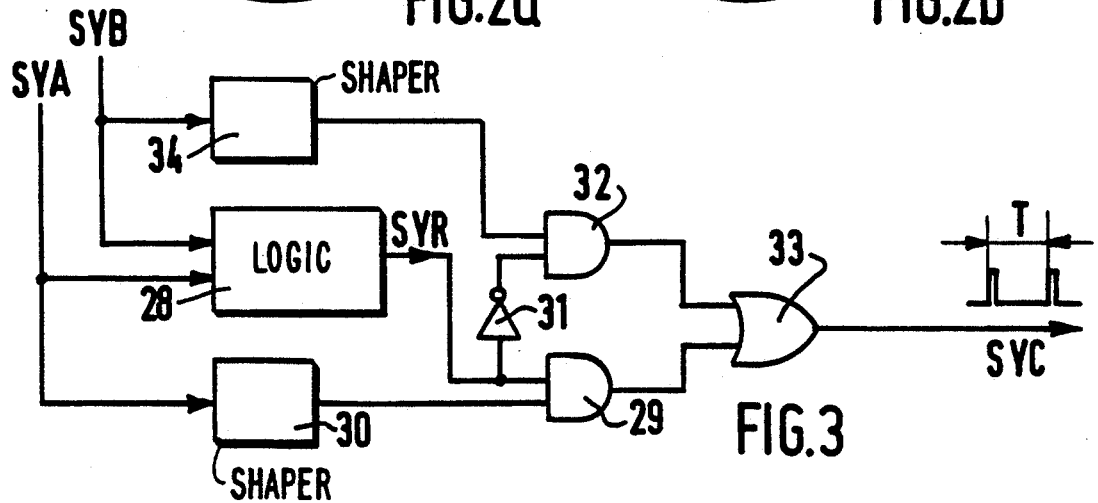

SIGNAL PHASING ARRANGEMENT IN A SYSTEM FOR DOUBLING THE DIGITAL CHANNEL

FIELD OF THE INVENTION

The invention relates to a phasing arrangement in a synchronous digital information block transmission system, for phasing signals over two digital channels carrying respective frames TRA or TRB, these frames conveying the same information but being affected by different delays, comprising for each channel a frame locking means which generates a synchronizing (sync) signal in response to a low-frequency superframe signal. At least one variable delay means is controlled in response to said sync signal by means of a phase comparator followed by a control element.

BACKGROUND OF THE INVENTION

Any digital transmission system may be disturbed by a large number of causes, such as the imperfection of the transmission medium (for example, a radio relay link), the presence of noise on the transmission channel, radio interference or a breakdown. These disturbances are manifested, on the side of the user, by an error rate in the bit stream used and by periods of time during which transmission is interrupted, which poses a general technical problem. When the cost of the bit stream is not too high, more specifically in ground-based communication networks, a simple prior-art solution for solving the general technical problem mentioned above consists of diversity transmission duplicating the signal to be transmitted, transmitting the signal over two separate channels and selecting the better of the two signals on reception. The present invention in this context is related to the doubling of the digital channel, in which situation the particular problem is posed of correcting the phase of the two received signals. Among other applications, this phase correction allows the receiving arrangement to switch over from one signal to another without causing errors as a result of the loss of the frame clock, and so on. In these conditions it becomes possible to change from a signal of frame TRA to a signal of frame TRB as often as necessary, in response to the respective errors in each frame, using the maximum errorless period of time of each digital path without the risk of degrading the composite signal.

In order to re-establish signal equalization on two digital paths that carry the same information it is known, more specifically from U.S. Pat. No. 4,218,654, to form a negative feedback loop between the output and control input of a variable delay circuit inserted in a first information channel, while a control circuit which also receives the same information present on a second channel is incorporated in the loop. Such an arrangement leads to drawbacks inherent with any control element, which are the complexity of its use and its slowness.

BACKGROUND OF THE INVENTION

It is an object of the invention to effect a phase correction of signals of two digital frames which is accurate, simple and fast by taking off the frame sync signals upstream of the variable delay means.

It is a further object of the invention to effect a phase correction of two digital signals while using variable delay means, while simultaneously introducing a fixed additional delay of the two signals which has a predetermined value.

These objects are achieved and the prior-art drawbacks remedied by an arrangement in which the; variable delay means comprises a common double memory with cyclic addressing in which each location contains a block of frame TRA and a block of frame TRB which have the same rank within the frames. Addressing is effected in the write mode by two separate write counters, the respective locked on to each sync signal and, in the read mode, by a read counter which forms part of said control element. The frame locking means is connected to the input of the arrangement, upstream of the double memory. The phase comparator is selects from the two sync signals the one which is the more delayed, and transmits this signal to said control element, the information signals TRA' coming from the frame TRA and TRB' coming from the frame TRB being absolutely synchronous at the output of said double memory.

The arrangement according to the invention is devised for operating in a synchronous environment where there are only the problems of jitter of the clock signal which are considered by the invention. This makes it possible to dispense with a complex and slow control loop.

The use of a double cyclic addressing memory as a common variable delay means presents various advantages. Since the duration of the addressing cycle of this memory is proportional to the duration of the superframe signal, it is thus possible to write blocks of the same rank of the frame TRA and of the frame TRB into each double location of the memory at different instants. In addition, reading out each location thus inscribed makes it possible to obtain at the output of the arrangement a perfect synchronization for the two frames that have been affected by different variable delay through the memory. For the arrangement to operate properly it is necessary that the memory is read out always after the most delayed signal has been inscribed, which additional technical problem is solved by the invention.

According to a preferred embodiment which reduces the capacity of the double memory to a minimum and makes it possible to ensure a minimum delay for the frame signals between the input and output of the arrangement, the duration of the addressing cycle of the double memory is equal to half a period of the superframe signal.

According to another preferred embodiment of the invention, the signal phasing arrangement is characterized in that said control element which comprises said read counter also includes a coincidence detector devised for comparing a read sync signal it receives from said read counter with the most delayed sync signal. This detector feeds to the read counter a reload signal that has a value shifted by a predetermined intiger M relative to the lower load value of the two write counters when the time-dependent shift between the two signals it receives exceeds a predetermined value adapted to the phase jitter, of the order of several dozen bits. In this version of the arrangement the memory is read out with a fixed delay after the most delayed signal has been written into the memory.

A preferred embodiment of the arrangement according to the invention, related to the masking of transmission errors, is characterized in that the arrangement further includes a change-over switch which receives said information signals TRA' and TRB' synchronized with or coming from the respective frames TRA and TRB, said change-over switch being controlled by way of error detectors connected to the input of said phasing arrangement upstream of the double memory, and a switching means which switches the change-over switch to that double memory output which corresponds to the least erroneous input frame; and in that said predetermined number M causes a fixed delay TF in the double memory, which delay is longer than the period of time necessary for error detection in the frames TRA or TRB with the aid of the error detectors.

Thus, if it is possible to rapidly detect the errors in the received signal and if the two channels are not disturbed at the same time, it is possible to switch the recovered signal to the undisturbed channel before the disturbance is transmitted.

BRIEF DESCRIPTION OF THE DRAWINGS

The following description with reference to the annexed drawings and given by way of non-limitative example will make it better understood how the invention can be realised.

FIG. 1 is a block diagram of the signal phasing arrangement according to the invention;

Figure 4:
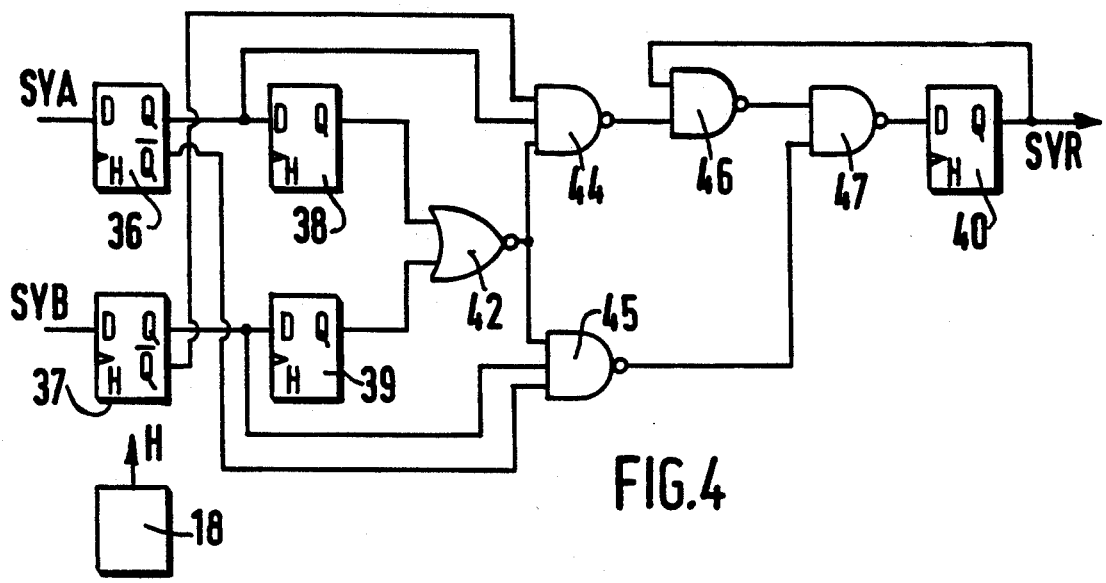
Figure 7:
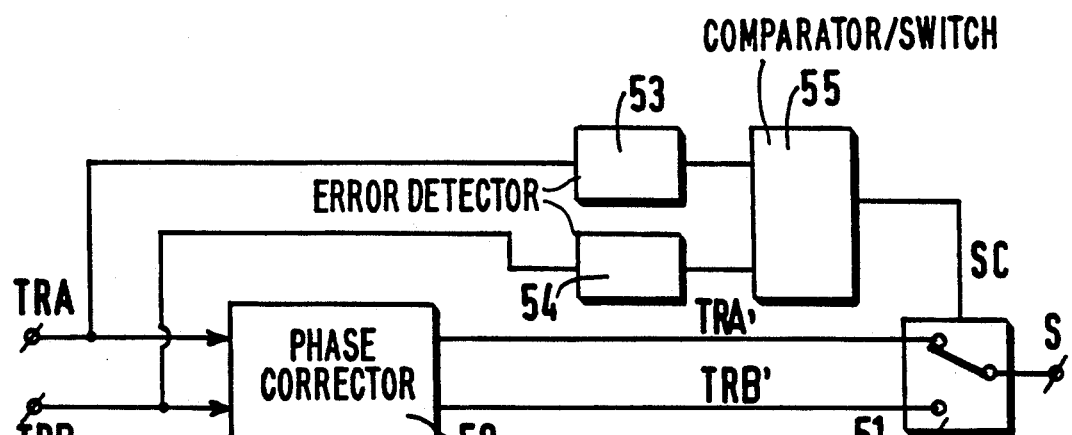
Figure 6:
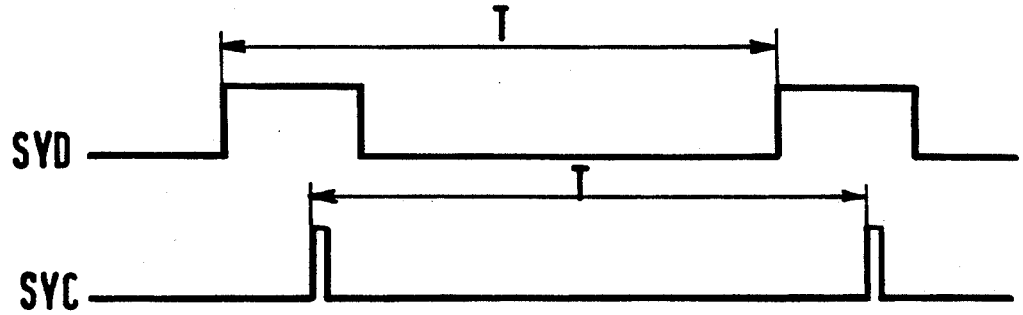
Figure 5:
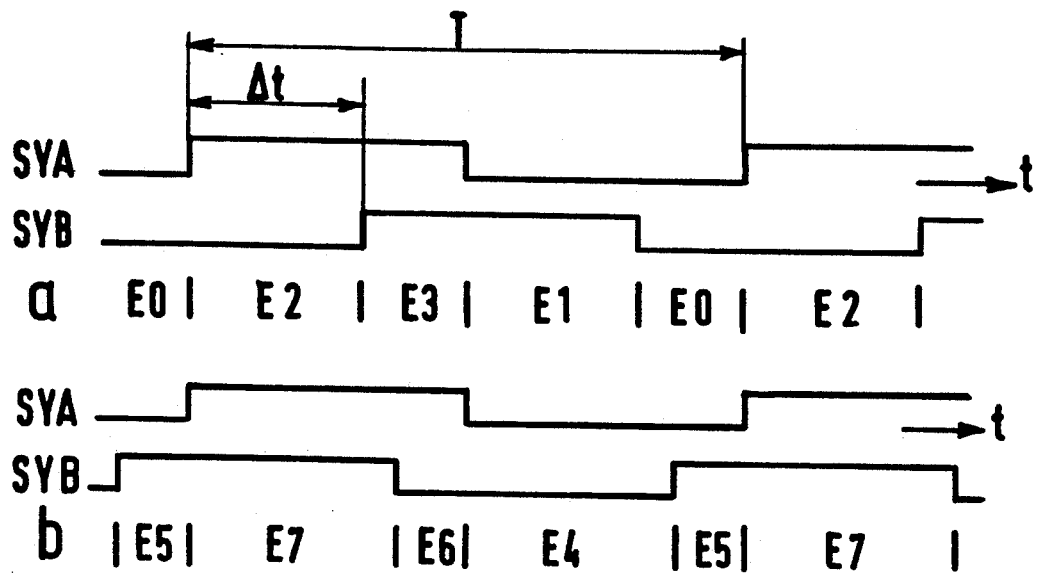
Figure 5C:
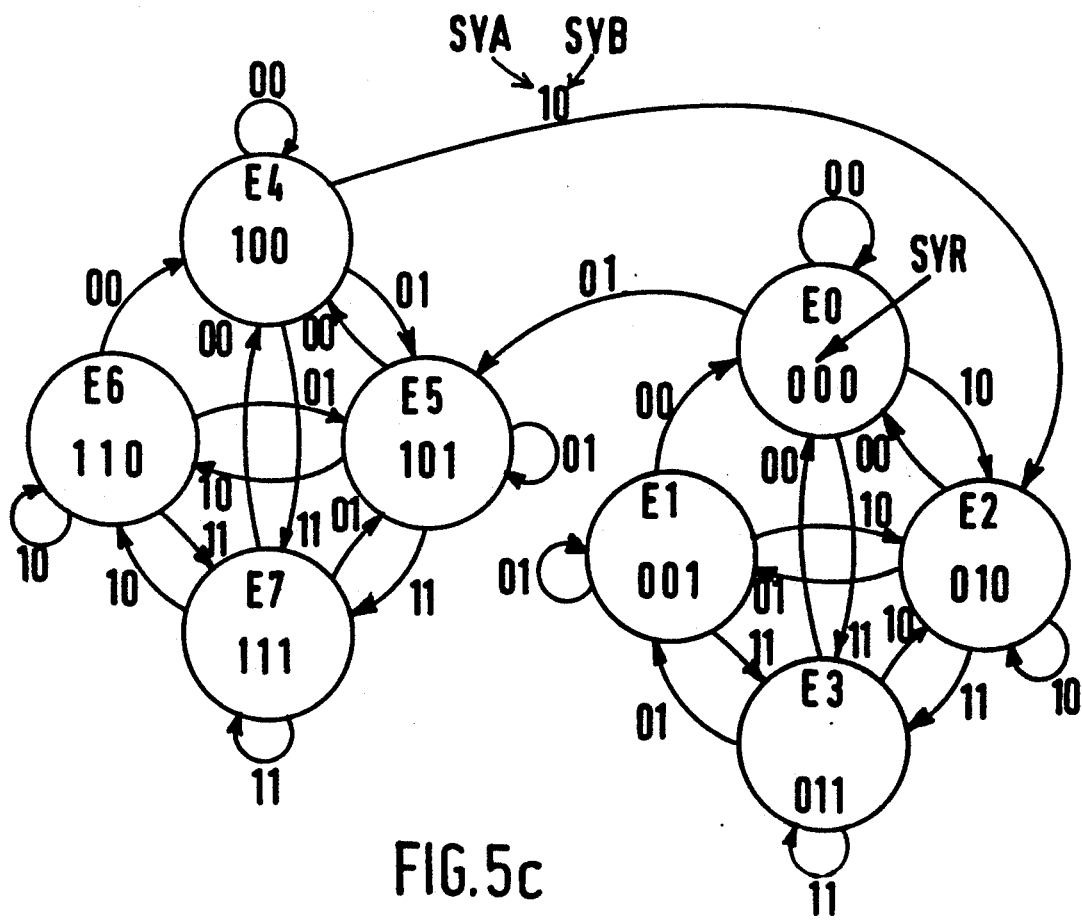

The FIGS. 2a and 2b are circular time diagrams illustrating the cyclic addressing of the double memory of FIG. 1;

FIG. 3 represents in a diagrammatic form the phase comparator of FIG. 1;

FIG. 4 shows the electronic diagram of the finite state machine logic circuit of FIG. 3;

FIGS. 5a and 5b are time diagrams of the sync signals SYA and SYB;

FIG. 5c is a state diagram which makes it possible to explain the operation of the finite state machine of FIG. 4;

FIG. 6 is a time diagram illustrating the internal operation of the control element of FIG. 1; and FIG. 7 is a block diagram of the phasing arrangement according to the invention used for the masking of transmission errors.

DESCRIPTION OF PREFERRED EMBODIMENTS

FIG. 1 shows two digital channels (or paths) 1 and 2 transporting the respective frames signals TRA and TRB which carry the same information but are affected by different delays. For example, let us assume a 2048 kbit/s time-division telephone transmission system, in which each frame comprises 32 telephone channels, at a rate of one sample encoded over 8 bits for each channel. This produces frames of 256 bits. The maximum envisaged phase shift between the signals TRA and TRB is large and may become several hundred frames. In the digital example under discussion this maximum phase shift is, for example, equal to 256 frames, that is to say, 65536 bits.

In a known fashion the frame signal comprises, at regular time intervals, free bits which may particularly be used for timing recovery. This invention uses one of these bits for creating a low-frequency superframe signal whose period T is at least equal to double the maximum phase shift expressed in bit time (TBI). In the 2048 kbit/s frame mentioned before, the frequency of the superframe signal is, for example, equal to 15 Hz.

Each signal TRA, TRB is applied partly to a separate frame locking means 3, 4 and to common variable delay means 5 constituted by a double memory. The memory 5 is preferably a circular memory of the static double access RAM type.

Each frame locking means 3, 4 of a conventional concept is devised for detecting in the frame signal the pattern of the low-frequency superframe in order to lock on to this pattern and produce a frame sync signal SYA, SYB in the form of a square wave signal having a period T. Each signal SYA, SYB is applied to a counter 7, 8 and these two signals are also applied to a phase comparator 9. For completeness, the diagram shows that the phase comparator 9 applies a pulse signal SYC having a period T to a control element 11 which is formed by a read counter 12 and a coincidence detector 13. The detector 13 receives the signal SYC and a sync signal SYD which has a period T coming from the counter 12, and applies a reload signal SR to the counter 12 over a conductor 14 if there is no phase coincidence between these two signals. The counters 7, 8 and 12 respectively, which are cyclic counters, are used for the addressing of memory 5 in the write or read mode respectively, over address buses 15, 16 for the write mode and bus 17 for the read mode. At the rate of the data bits (having period TBI) a clock generator 18 applies a clock signal H to all the circuits of FIG. 1 (the connection with these circuits being intentionally omitted for clarity of the drawing). In the memory 5 the clock signal H or, preferably, a derived signal H', which has a frequency of 1/TB of the bytes or the frames which represent the data blocks, is used for writing and reading the data blocks. Each write counter 7, 8 is locked on to the sync signal SYA, SYB, while its MSB (for example, the weight 16) is activated with the frequency 1/T and its LSB with the frequency of the data bits (signal H). For addressing operations in the write mode and read mode it is possible to use all the significant bits of the counters as defined above, in which case the capacity of the memory 5 is equal to the number of data bits contained in a period T of the superframe signal. Advantageously, the MSB is not used for the addressing, which permits reducing the capacity of the memory 5 to half the capacity indicated above. Each location 19 of the memory is double and contains just before it is read out a block of TRA and a block of TRB, these two blocks having the same rank in the period defined by superframe signals which correspond to each other in TRA and TRB, these two blocks thus carrying the same information apart from the transmission errors. Reading each memory location provides absolutely synchronous frame signals TRA', TRB' at two output terminals 23, 24.

In the FIGS. 2a and 2b the addressing of memory 5 is represented in the form of a circle 26 on which, at a given instant $t_0$ controlled by the signal H', the write locations are indicated by the arrows denoted WA, WB for the respective entries of different blocks of the frames TRA and TRB, separated by an interval $\Delta t$ which represents the phase shift to be cancelled. At the instant $t_0$ the reading is represented by the arrow R shifted with respect to the writing of the most delayed data signal by a predetermined number of blocks M×TB (in this case signal TRB). The number M is selected to be the lowest possible when the use envisaged by the arrangement does not introduce a fixed delay over memory 5. The minimum value of M depends on the mutual precision between the write and read instants provided by the system, which precision is linked with the phase jitter. FIG. 2b represents time-dependent uncertainty ranges $\Delta WA$, $\Delta WB$ for writing and ΔR for reading. Under these conditions the value of M is to be in conformity with the following equation:

$$M \times TB > \frac{\Delta WB + \Delta R}{2}$$

In FIG. 2a the next write and read cycles are represented by broken line errors near to and similar to the solid line errors.

The delay M×TB of the reading relative to the writing of the most delayed signal can be realised for the data signals TRA and TRB by using the phase comparator 9, described with reference to the FIGS. 3, 4 and 5. The phase comparator represented in FIG. 3 comprises a logic circuit, or finite state machine 28 which receives the sync signals SYA and SYB and produces a logic signal SYR which has the value "0" when SYB is delayed relative to SYA (see FIG. 5a) and the value "1" in the opposite case (see FIG. 5b). The signal SYR acts as a switch control signal. For this purpose the signal SYR is, for example, transmitted to an input of a logic AND gate 29 which receives at a second input the signal SYA after it has been transformed into a pulse signal by means of circuit 30; and is also transmitted, via an inverter 31, to an input of an AND circuit 32 which also receives the signal SYB after it has been transformed into a pulse signal by circuit 34. The outputs of the AND circuits 29 and 32 are connected to the inputs of an OR circuit 33 whose output produces a pulse signal SYC. Thus, when SYB is the more delayed of the two sync signals, this signal SYB is transmitted by way of pulses and in the opposite case it is the signal SYA that is transmitted by way of pulses.

The shaping circuits 30, 34 respectively, transform the square-wave signal SYA, SYB respectively, into a pulse signal by way of a monostable action on the leading edge or, preferably, on the trailing edge of the respective square-wave signals they receive.

The finite state machine 28 of FIG. 3 may be realised by means of the circuit of FIG. 4 which is constituted by five D flip-flops 36 to 40, one NOR gate 42 and four NAND gates 44, 45, 46, 47. All the flip-flops receive the signal H at their clock inputs. The flip/flop 36 receives the signal SYA at its D input, its Q output being connected to the D input of the flip-flop 38 and to an input of the NAND gate 44, and its $\overline{Q}$ output being connected to an input of the NAND gate 45. In a symmetrical fashion the flip-flop 37 receives the signal SYB on its D input, its Q output being connected to the D input of the flip-flop 39 and to another input of the NAND gate 45 and its $\overline{Q}$ output being connected to a second input of the NAND gate 44. The Q outputs of the flip-flops 38 and 39 are connected each to an input of the NOR gate 42 whose output is connected to second inputs of the NAND gates 44 and 45 respectively. The NAND gates 46, 47 and the flip-flop 40 are connected in this order in a chain between the output of NAND gate 44 and the output of the finite state machine which carries the signal SYR, and which is similar to the Q output of the flip-flop 40, this output furthermore being connected to a second input of the NAND gate 46 and the output of the NAND gate 45 being connected to a second input of the NAND gate 47.

The circuit which has just been described establishes the state diagram represented in FIG. 5c which can be read in conjunction with the FIGS. 5a and 5b. In FIG. 5a the signal SYB is represented as a delayed version (maximum delay equal to π) relative to the signal SYA, which corresponds to the value SYR=0 (see the part to the right of FIG. 5c) and corresponds to pairs of the following states for SYA and SYB:
E0=00, E2=10, E3=11, E1=01.

In FIG. 5b the signal SYA is delayed the most, which corresponds to: SYR=1 (part to the left of FIG. 5c) and corresponds to the pairs of following states for SYA and SYB:
E5=01, E7=11, E6=10, E4=00.

In the read control element 11 (see FIG. 1) the coincidence detector 13 receives the signal SYC and the signal SYD coming from the read counter 12, which signals are represented in FIG. 6. The signal SYD which is sychronized with the counting cycle of the read counter having a predetermined delay lasting approximately M×TB (see FIG. 2a) has a low cyclic ratio, well below 0.5, and is presented in the form of a pulse signal having the same period (T) as SYC, but whose pulse duration is longer than that of SYC. When the pulse of SYC is produced in the course of the pulse duration of SYD as represented in FIG. 6, the phasing arrangement operates in a nominal manner as already described with reference to the FIGS. 2a and 2b. The difference in pulse width is controlled so as to make a maximum jitter cancellation possible (of the order of several dozen bits) which may occur between the clock signal H and the different signals present in the arrangement, more particularly, between the signals SYC and SYD. If, alternatively, the pulses of SYC and SYD do not coincide in time as is the case, for example, when power is applied to the arrangement, a reload signal SR will be transmitted to the reset input of the counter 12 in the form of a logic "1" or logic "0", which causes the pulse of SYD to be adjusted to that of SYC and, simultaneously, the counting of the read addresses to be reset to their nominal value (FIG. 2a), it being understood that the counter is devised by way of its structure for providing the optimum shift between read and write addresses when the signals SYC and SYD are substantially in phase. The concept and the arrangement of the circuits 12 and 13 and of the memory 5 for performing the simple functions described hereinbefore are within the grasp of those skilled in the art.

By means of a simple relative preliminary adjustment between the read cycle and the transmission of the signal SYD it is thus possible to adjust the value of integer M by a minimum value just necessary to correct the phase of the signals TRA, TRB in the form of the sync signals TRA', TRB', to a value which adds an additional fixed delay TF of the signals TRA', TRB' relative to the signals TRA, TRB without changing anything in the structure or the operation of the arrangement of FIG. 1. This additional delay function may turn out to be useful for certain applications as, for example, the application to be described hereinafter with reference to FIG. 7.

FIG. 7 represents in 50 the arrangement as shown in FIG. 1, which receives on its two inputs the respective signals TRA and TRB and delivers the signals TRA' and TRB' to the selection terminals of a change-over switch 51 whose output provides an arrangement output signal S which is either the signal TRA' (as represented in the Figure) or the signal TRB' depending on the state of the change-over switch as a result of signal SC on a control input. The arrangement of FIG. 7 is intended for masking transmission errors.

For this purpose, the arrangement comprises error detectors 53, 54 whose inputs are connected to two inputs of the arrangement 50 and which produce possible error signals caused by switching means 55. The switching means 55 is devices the relative qualities of the frame signals TRA and TRB it receives, and transmits the control signal SC in the form of a logic "0" or "1" signal, so that at any time, the state of the switch 51 causes the better of the two frame signals TRA' or TRB' to be produced at the output of the switch. The circuits 53, 54 and 55 are well known to the expert and need not be described in detail.

The fact that the switch 51 can be changed-over any time is due to the perfect synchronization of two signals TRA' and TRB' and is thus effected without loss of information which would be due to the switching itself. For that matter, in this embodiment, the number M is controlled at 50 so as to introduce a fixed delay TF which is longer than the period of time necessary for the error detection through the error detectors 53 and 54 augmented by the time necessary for the error comparison in 55.

As regards the technology used for the realisation of the arrangement shown in FIG. 1 it is possible to use for the memory 5 a static 256 kbit RAM and integrate the other elements 3, 4, 7, 8, 9, 12, 13 and 18 in the form of a single integrated circuit.

We claim:

1. A circuitry arrangement for phase synchronization of synchronous digital signals received from first and second channels of a channel diversity transmission system, said signals being transmitted in frames which are synchronized to a low frequency superframe signal, respective frames TRA and TRB from said first and second channels containing the same information but being affected by different transmission delays, said arrangement comprising two inputs for receiving respective said signals from said channels; a respective frame locking means for each channel, for generating a respective sync signal responsive to the low frequency superframe signal received on the respective channel; a phase comparator receiving said sync signals, and having an output; a variable delay means for delaying signals received from one of said channels; and a control element receiving said output for controlling said variable delay means, characterized in that said variable delay means comprises:

a double memory common to both channels, said double memory having a respective output for each said channel and cyclic addressing, each memory location in said double memory containing a block of signals from said frame TRA and a block of signals from said frame TRB, said blocks having the same rank within the respective frames, two separate write counters for addressing said memory in a write mode, each write counter being locked to a respective said sync signal, and a read counter, forming part of said control element, for addressing said memory in a read mode, and said phase comparator being arranged for selecting from said sync signals the one which is more delayed, and for transmitting the more delayed sync signal to said control element, said variable delay means thereby causing information signals, from said frame TRA and from said frame TRB respectively, to be absolutely synchronous at said respective outputs of said double memory.

2. An arrangement as claimed in claim 1, characterized in the duration of the addressing cycle of the double memory is equal to half a period of the superframe signal.

3. An arrangement as claimed in claim 2, characterized in that said double memory is of the double access static RAM type.

4. An arrangement as claimed in claim 3, characterized in that said read counter has a load value and an output comprising a read sync signal, each of said write counters has a respective load value, and said control element comprises a coincidence detector arranged for receiving and comparing said read sync signal and said more delayed sync signal; responsive to the time delay between said read sync signal and said more delayed sync signal exceeding a predetermined value adapted to the phase jitter, said predetermined value being of the order of several dozen bits, feeding to the read counter a reload signal that has a value shifted by a predetermined integer M relative to said more delayed sync signal.

5. An arrangement as claimed in claim 4, adapted for masking of transmission errors, characterized in that the arrangement further comprises two error detectors, a comparator, a change-over switch for selecting one of said respective outputs of said double memory to provide an output signal of said arrangement, and means for switching said change-over switch to the respective output of said double memory having the least erroneous said signals, each error detector being connected to a respective said input of said arrangement for receiving the respective said signals and producing relative error signals, said comparator being connected to said error detectors for determining which said signals are least erroneous, and having an output connected to said means for switching, and said control element causing a fixed delay in reading said double memory based on said predetermined integer M, said fixed delay being longer than the time required for detection of said errors by said error detectors.

6. An arrangement as claimed in claim 2, in a 2048 kbit/s transmission system for 32×8 bit frames, characterized in that said superframe signal has a frequency of 15 Hz.

7. An arrangement as claimed in claim 1, characterized in that said double memory is of the double access static RAM type.

8. An arrangement as claimed in claim 7, characterized in that said read counter has a load value and an output comprising a read sync signal, each of said write counters has a respective load value, and said control element comprises a coincidence detector arranged for receiving and comparing said read sync signal and said more delayed sync signal; responsive to the time delay between said read sync signal and said more delayed sync signal exceeding a predetermined value adapted to the phase jitter, said predetermined value being of the order of several dozen bits, feeding to the read counter a reload signal that has a value shifted by a predetermined integer M relative to said more delayed sync signal.

9. An arrangement as claimed in claim 8, adapted for masking of transmission errors, characterized in that the arrangement further comprises two error detectors, a comparator, a change-over switch for selecting one of said respective outputs of said double memory to provide an output signal of said arrangement, and means for switching said change-over switch to the respective output of said double memory having the least erroneous said signals, each error detector being connected to a respective said input of said arrangement for receiving the respective said signals and producing relative error signals, said comparator being connected to said error detectors for determining which said signals are least erroneous, and having an output connected to said means for switching, and said control element causing a fixed delay in reading said double memory based on said predetermined integer M, said fixed delay being longer than the time required for detection of said errors by said error detectors.

10. An arrangement as claimed in claim 1, characterized in that said read counter has a load value and an output comprising a read sync signal, each of said write counters has a respective load value, and said control element comprises a coincidence detector arranged for receiving and comparing said read sync signal and said more delayed sync signal; responsive to the time delay between said read sync signal and said more delayed sync signal exceeding a predetermined value adapted to the phase jitter, said predetermined value being of the order of several dozen bits, feeding to the read counter a reload signal that has a value shifted by a predetermined integer M relative to said more delayed sync signal.

11. An arrangement as claimed in claim 10, in a 2048 kbit/s transmission system for 32×8 bit frames, characterized in that said superframe signal has a frequency of 15 Hz.

12. An arrangement as claimed in claim 11, characterized in that said double memory has a capacity of 256 kbit/s.

13. An arrangement as claimed in claim 12, adapted for masking of transmission errors, characterized in that the arrangement further comprises two error detectors, a comparator, a change-over switch for selecting one of said respective outputs of said double memory to provide an output signal of said arrangement, and means for switching said change-over switch to the respective output of said double memory having the least erroneous said signals, each error detector being connected to a respective said input of said arrangement for receiving the respective said signals and producing relative error signals, said comparator being connected to said error detectors for determining which said signals are least erroneous, and having an output connected to said means for switching, and said control element causing a fixed delay in reading said double memory based on said predetermined integer M, said fixed delay being longer than the time required for detection of said errors by said error detectors.

14. An arrangement as claimed in claim 11, adapted for masking of transmission errors, characterized in that the arrangement further comprises two error detectors, a comparator, a change-over switch for selecting one of said respective outputs of said double memory to provide an output signal of said arrangement, and means for switching said change-over to the respective output of said double memory having the least erroneous said signals, each error detector being connected to a respective said input of said arrangement for receiving the respective said signals and producing relative error signals, said comparator being connected to said error detectors for determining which said signals are least erroneous, and having an output connected to said means for switching, and said control element causing a fixed delay in reading said double memory based on said predetermined integer M, said fixed delay being longer than the time required for detection of said errors by said error detectors.

15. An arrangement as claimed in claim 10, adapted for masking of transmission errors, characterized in that the arrangement further comprises two error detectors, a comparator, a change-over switch for selecting one of said respective outputs of said double memory to provide an output signal of said arrangement, and means for switching said change-over switch to the respective output of said double memory having the least erroneous said signals, each error detector being connected to a respective said input of said arrangement for receiving the respective said signals and producing relative error signals, said comparator being connected to said error detectors for determining which said signals are least erroneous, and having an output connected to said means for switching, and said control element causing a fixed delay in reading said double memory based on said predetermined integer M, said fixed delay being longer than the time required for detection of said errors by said error detectors.

* * * * *